(12) United States Patent
Lam

(10) Patent No.: US 7,136,052 B1
(45) Date of Patent: Nov. 14, 2006

(54) BI-STABLE STYLUS FOR USE AS AN INPUT AID

(75) Inventor: Lawrence Lam, San Jose, CA (US)

(73) Assignee: Palm, Inc., Sunnyvale, CA (US)

(*) Notice: Subject to any disclaimer, the term of this patent is extended or adjusted under 35 U.S.C. 154(b) by 349 days.

(21) Appl. No.: 10/087,306

(22) Filed: Feb. 28, 2002

(51) Int. Cl.
*G09G 5/00* (2006.01)
*G08C 21/00* (2006.01)

(52) U.S. Cl. .............. 345/179; 345/184; 178/19.01; 178/19.04; 178/19.05

(58) Field of Classification Search ........ 345/173–184; 178/18.01–18.07, 19.01–19.07
See application file for complete search history.

(56) References Cited

U.S. PATENT DOCUMENTS

| | | | | |
|---|---|---|---|---|
| 1,807,444 A | * | 5/1931 | Shatkin | 401/95 |
| 4,729,686 A | * | 3/1988 | Ambasz | 401/117 |
| 5,584,195 A | * | 12/1996 | Liu | 63/1.12 |
| 5,889,512 A | * | 3/1999 | Moller et al. | 345/179 |
| 6,249,277 B1 | * | 6/2001 | Varveris | 345/179 |
| 6,388,870 B1 | * | 5/2002 | Canova et al. | 361/683 |
| 2002/0158854 A1 | * | 10/2002 | Ju | 345/179 |
| 2003/0151982 A1 | * | 8/2003 | Brewer et al. | 368/46 |

* cited by examiner

*Primary Examiner*—Vijay Shankar

(57) ABSTRACT

Embodiments of the present invention include a stylus for use with a touch screen having a digitizer, the stylus being configured to fit comfortably in the hand of the user and comprises: an elastic segment; an operating end tapered to a point coupled to the elastic segment; a second end cap coupled to the elastic segment and a plurality of mid-segments coupled to the elastic segment. In one embodiment the stylus comprises four different parts including a tip, an end cap, mid-segments and an elastic member. Furthermore, in one embodiment, a simple spring is used to attach the tip, the end cap and the mid-segments. The stylus can be locked into place while in use or can be bent to conform to the geometry of the portable electronic device. The result is a bi-stable stylus sized to conform to a user's hand that can be stored on smaller dimensioned portable electronic devices. Additionally, the cost of manufacturing such a stylus is reduced because the variety of parts is minimal.

25 Claims, 11 Drawing Sheets

(Prior Art) Figure 1

BI-STABLE STYLUS FOR USE AS AN INPUT AID

FIELD OF THE INVENTION

The present invention generally relates to the field of data input devices. More particularly, embodiments of the present invention relate to the field of stylus input device aids.

RELATED ART

A Personal Digital Assistant (commonly referred to as a PDA) is a portable computer system. The PDA is a portable handheld device that is used as an electronic organizer which has the capability to store a wide range of information that includes daily appointments, numerous telephone numbers of business and personal acquaintances, and various other information. Furthermore, the Personal Digital Assistant has the ability to connect to a personal computer system, enabling the two devices to exchange updated information. Additionally, the PDA can be connected to a modem, enabling it to have electronic mail (e-mail) capabilities over the Internet along with other Internet capabilities over a wireless communication interface. Also, the Personal Digital Assistant can be coupled to a networking environment.

Typically, the PDA includes a data input device such as a handwriting recognition device that can be utilized to control and operate the PDA. The handwriting recognition device receives user input as handwriting stroke data, where a user utilizes a stylus to stroke alphanumeric characters and analog characters (e.g., *, &, @, $, etc.) on the handwriting recognition device. The handwriting recognition device processes the handwriting stroke data and transmits the processed data to another component (e.g., an electronic display device, a memory unit, a processor, etc.) of the PDA so that a particular operation or function can be performed. PDAs are enormously popular, in part because of their handwriting recognition device.

However, as PDA technology becomes more sophisticated, the size of the PDA becomes smaller and smaller. As a result, the size of the input device or stylus has also been miniaturized to conform to the smaller size of the PDA. While most users prefer the smaller, less bulky design of the PDA, many find that the smaller size of the stylus is difficult to use, inhibits performance and may cause problems such as hand cramping and wrist strain. Many users use the stylus input device in a similar manor that they use a pen or pencil. Therefore, a miniature stylus can cause users to feel unfamiliar with the device and thus create user frustration.

To overcome the problems associated with a miniature stylus, a telescoping stylus has been developed. Prior Art FIG. 1 illustrates an example of a telescoping stylus 20. A telescoping stylus can be lengthened when used to give the stylus a much more satisfactory weight and feel. When not in use, the stylus can be collapsed for storage in a PDA's usual storage slot. One problem associated with the telescoping stylus 20 is the cost to manufacture. To manufacture a telescoping stylus, many different pieces such as different body segments 21 and the tip 22 must be made and then assembled to manufacture the product. As a result, the cost for a telescoping stylus can be considerably more than a standard stylus. Furthermore, when using the telescopic stylus 20, sometimes the tip collapses in on the body thereby impeding the data entry.

Thus, there exists a need for a stylus that conforms to the smaller size of a modern PDA yet provides the user with a comfortable feel as to eliminate hand cramping and wrist strain. In addition, the stylus should be cost effective to produce.

SUMMARY OF THE PRESENT INVENTION

In accordance with embodiments of the present invention, bi-stable stylus is disclosed to facilitate improved user comfort and data entry associated with smaller dimensioned portable electronic devices. Embodiments of the present invention provide a device that may be used for data entry with a portable electronic device such as a Personal Digital Assistant, a pager, a cell phone, etc. In addition, the present invention does not require special instructions or learning curve as do many data entry aids for personal digital assistants.

Embodiments of the present invention include a stylus for use with a touch screen having a digitizer. The bi-stable stylus is configured to fit comfortably in the hand of the user and comprises: an elastic segment; an operating end tapered to a point coupled to the elastic segment; a second end cap coupled to the elastic segment and a plurality of mid-segments coupled to the elastic segment.

More specifically, in one embodiment the stylus comprises four different parts including a tip, an end cap, mid-segments and an elastic member. Furthermore, in one embodiment, a simple spring is used to attach the tip, the end cap and the mid-segments. The stylus can be locked into place while in use or can be readily bent to conform to the geometry of the portable electronic device. The result is a stylus sized to conform to a user's hand that can be stored on smaller dimensioned portable electronic devices. Additionally, the cost of manufacturing the novel stylus is low because the variety of parts is minimal.

As discussed, the stylus of one embodiment of the present invention consists of four distinct parts consisting of a tip, mid-segments, an end cap and an elastic or spring part. The spring or elastic part spans between the tip and the end cap. The mid-segments take up the space between the tip and the end cap and have the spring or elastic segment running through the center of the mid segments. The elastic segment traps the mid segments between the end cap and the tip. Since the elastic member is under constant tension, a compressive force is distributed to the mid segments locking them in position while in use. The mid segments nest into each other to form a rigid part.

When the elastic member is stretched by pulling the stylus apart, the mid-segments un-nest and the unit can be bent into various shapes. By allowing the stylus to be bent, the novel stylus can be wrapped around the corner of a portable electronic device thus allowing a stylus with a length dimension larger than the length dimension of the portable electronic device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 3:
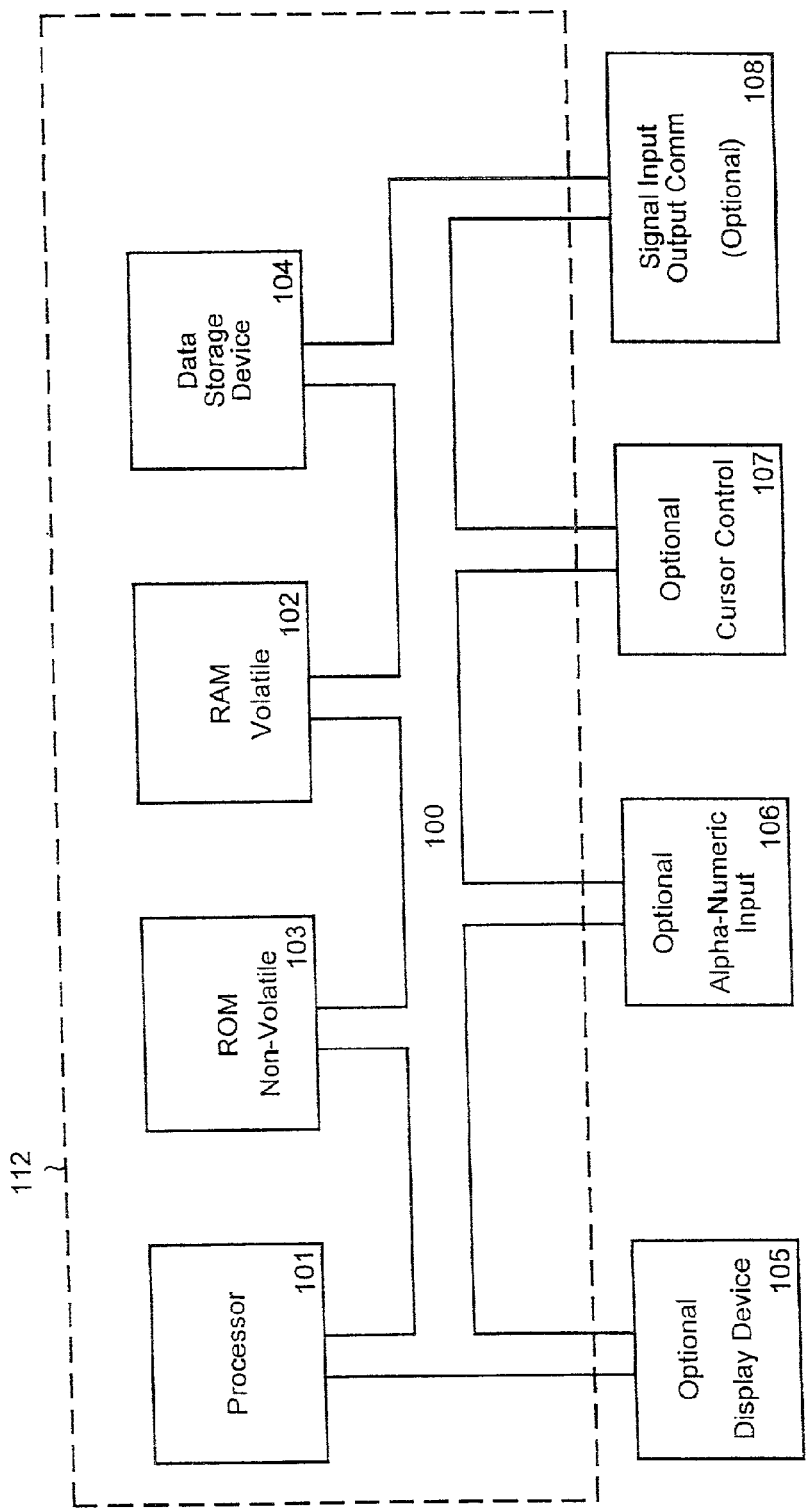
FIG. 3 illustrates a logical circuit block diagram of a handheld electronic system in which embodiments of the present invention can be practiced.
Figure 4:
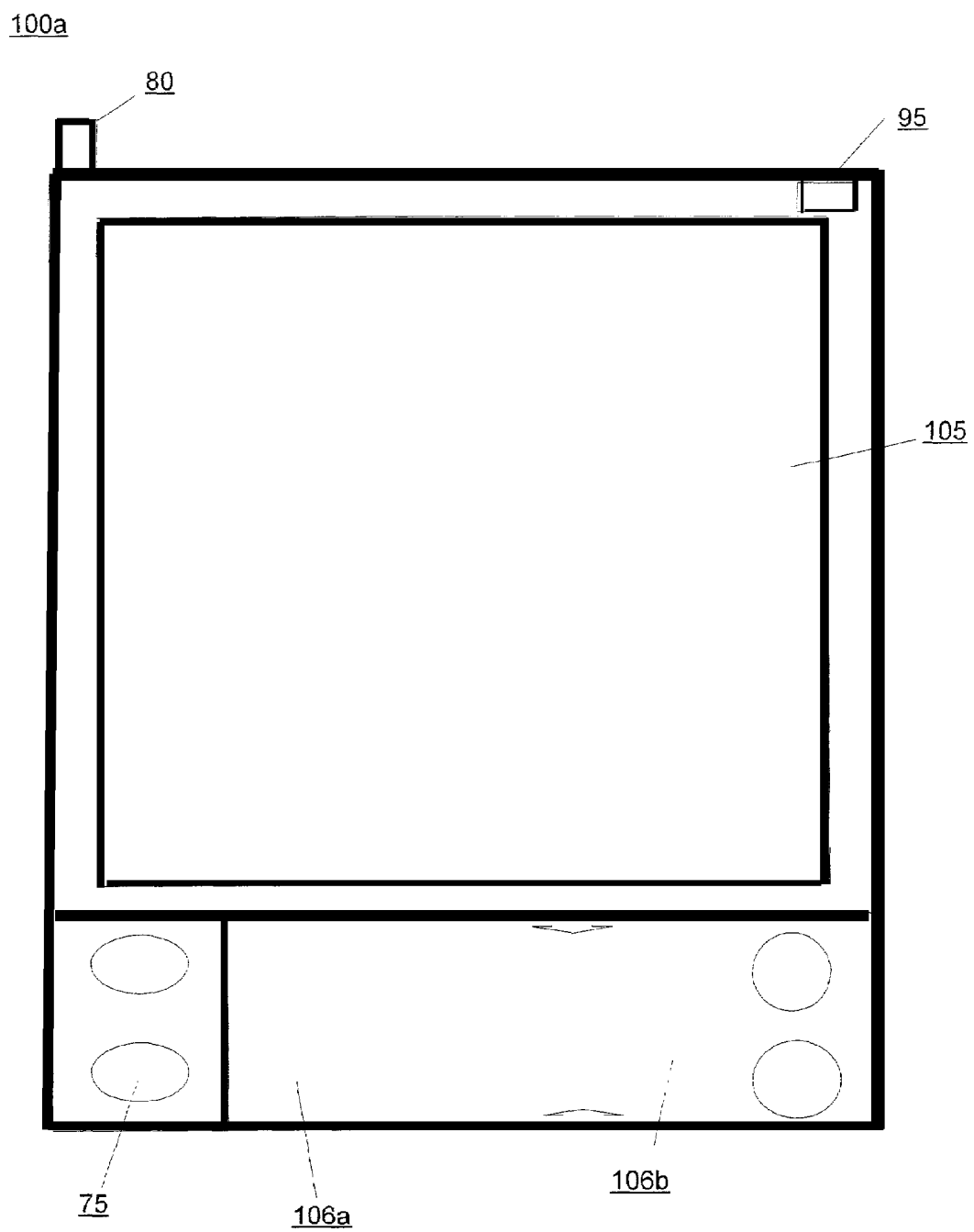
FIG. 4 is a top-side perspective view of an exemplary Personal Digital Assistant computer system.
Figure 5:
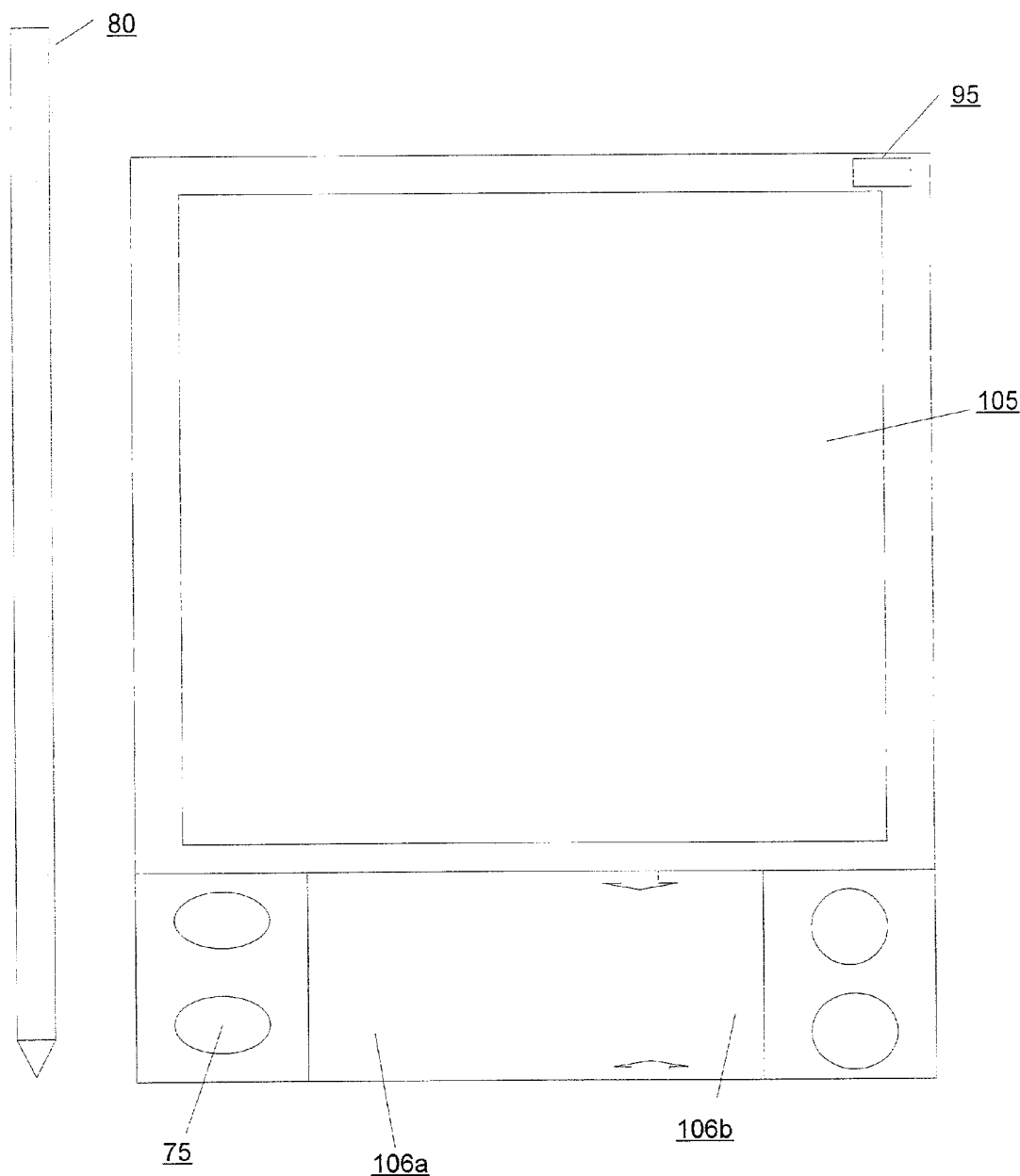
FIG. 5 is an illustration of a smaller dimensioned exemplary Personal Digital Assistant and a normally dimensioned stylus device.

Although the present invention may be implemented with a variety of different electronic systems such as a pager, a mobile phone, a calculator, a Personal Digital Assistant (PDA), etc., one exemplary embodiment includes the stylus with a portable computing system. It should be understood that the descriptions corresponding to FIGS. 3–5 provide information regarding an exemplary portable computing system.

Figure 1:
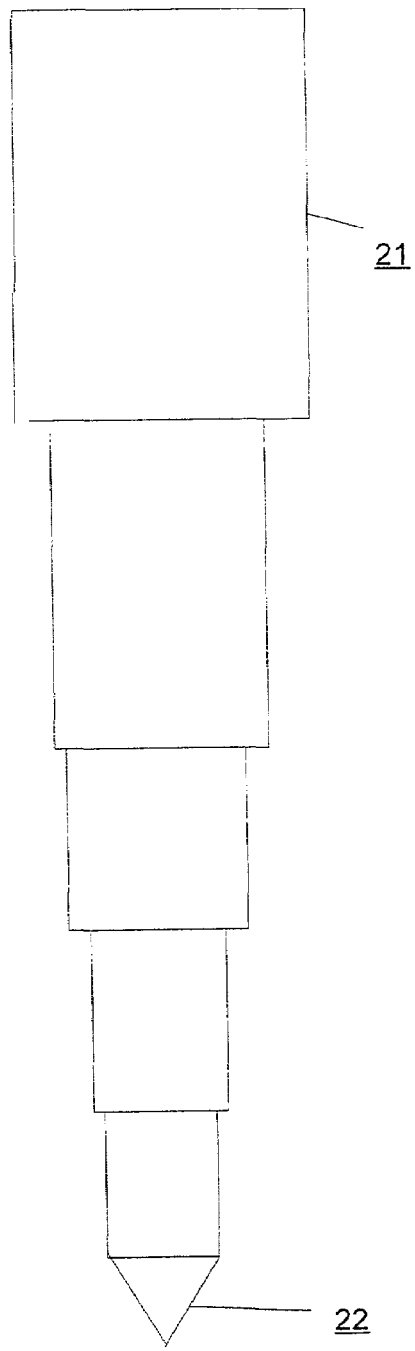
FIG. 1 is a prior art telescoping stylus used with smaller dimensioned portable electronic devices.
Figure 2:
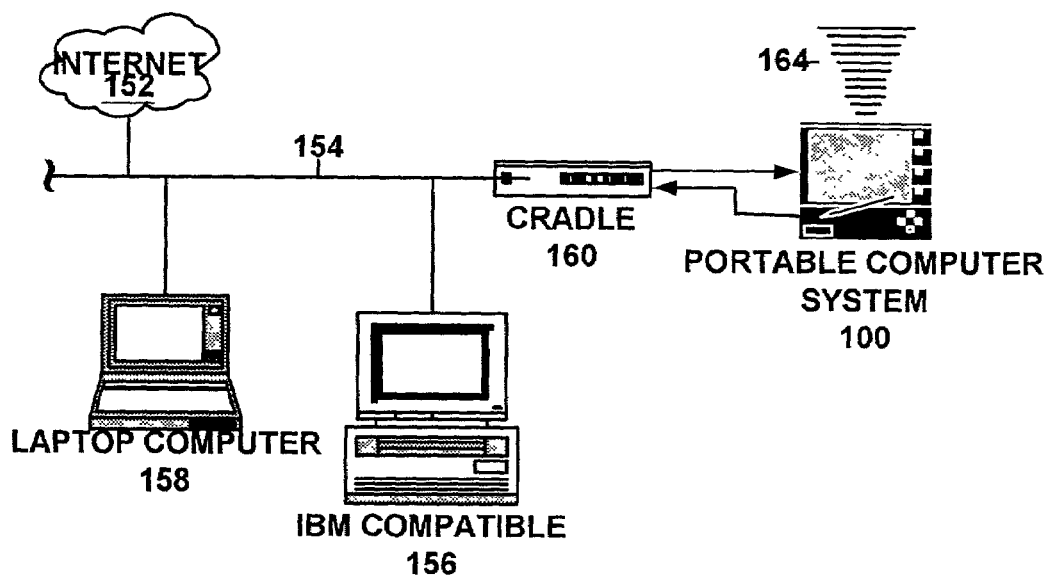
FIG. 2 illustrates a network environment, including a handheld electronic device coupled to a host computer system and the Internet via a cradle device, in which embodiments of the present invention can be practiced.

FIG. 2 illustrates a network environment 151, including a handheld electronic system (e.g., personal digital assistant 100) coupled to a host computer system and the Internet via a cradle device 160, in which embodiments of the present invention can be practiced.

Network environment 151 comprises a host computer system 156 which can either be a desktop computer system as shown, or, alternatively, can be a laptop computer system 158. Optionally, more than one host computer system 156 can be used within network environment 151. Host computer system 158 and 156 are shown connected to a communication bus 154, which in one embodiment can be a serial communication bus, but could be of any of a number of well known designs (e.g., a parallel bus, Ethernet Local Area Network (LAN), etc.). In an embodiment, bus 154 can provide communication with the Internet 152 using a number of well-known protocols.

Importantly, bus 154 is also coupled to a cradle 160 for receiving and initiating communication with the personal digital assistant 100. Cradle 160 provides an electrical and mechanical communication interface between bus 154 (and any device coupled to bus 154) and the Personal Digital Assistant 100 for two-way communications. The Personal Digital Assistant 100 also contains a wireless inferred communication mechanism 164 for sending information to other devices and for receiving information from other devices.

FIG. 3 is a block diagram of exemplary circuitry of a portable computing system 100 in accordance with one embodiment of the present invention. The computer system 100 includes a central processor for processing information and instructions. It is appreciated that central processor unit 101 may be a microprocessor or any other type of processor. The computer system 100 also includes data storage features such as a volatile memory 102 (e.g., random access memory, static RAM, dynamic RAM, etc.) for storing information and instructions for the central processor 101 and a non-volatile memory 103 (e.g., read only memory, programmable ROM, flash memory, EPROM, EEPROM, etc.) for storing static information and instructions for the processor 101. Computer system 100 may also include an optional data storage device 104 (e.g., thin profile removable memory) for storing information and instructions. It should be understood that data storage device 104 may be removable. Furthermore, device 104 may also be a secure digital (SD) card reader or equivalent removable memory reader. Also included in computer system 100 of FIG. 3 is an alphanumeric input device 106 which in one implementation is miniature keyboard and may include integrated push buttons.

System 100 of FIG. 3 also includes an optional cursor control or directing device 107 for communicating user input information and command selections to the central processor 101. In one implementation, device 107 is a touch screen device (also a digitizer) incorporated with screen 105. Device 107 is capable of registering a position on the screen 105.

Computer system 100 also contains a flat panel display device 105 for displaying information to the computer user. The display device 105 utilized with the computer system 100 may be a liquid crystal device (LCD), cathode ray tube (CRT), field emission device (FED, also called flat panel CRT), plasma or other display technology suitable for creating graphic images and alphanumeric characters recognizable to the user. In one embodiment, the display 105 is a flat panel multi-mode display capable of both monochrome and color display modes.

Also included in computer system 100 of FIG. 3 is a signal communication device 108 that may be a serial port (or USB port) for enabling system 100 to communicate PC 156. In one embodiment, the communication interface is a serial communication port, but could also alternatively be of any of a number of well known communication standards and protocols, e.g., parallel, SCSI, Ethernet, Firewire (IEEE 1394), USB, etc. including wireless communication.

With reference to FIG. 4, a perspective illustration of the top face 100a of exemplary Personal Digital Assistant computer system 100 is shown. Top face 100a contains a display screen 105 surrounded by a bezel or cover. A removable stylus 80 is also shown. Display screen 105 is a touch screen capable of registering contact between the screen and the tip of stylus 80. Stylus 80 can be fabricated of any material which can make contact with screen 105. Top face 100a also contains one or more dedicated and/or programmable buttons 75 for selecting information and causing computer system 100 to implement functions.

Referring still to FIG. 4, a handwriting recognition pad or "digitizer" containing regions 106a and 106b is also shown. Specifically, region 106a is for the drawing of alpha characters therein for automatic recognition and region 106b is for the drawing of numeric characters therein for automatic recognition. Stylus 80 is used for stroking a character within one of the regions 106a and 106b. The stroke information is then fed to an internal processor for automatic character recognition. Once characters are recognized, they may be displayed on screen 105 for verification and/or modification.

FIG. 5 is a perspective illustration 100c of the top face of an exemplary reduced size personal digital assistant computer system 100. In many configurations, Personal Digital Assistant 100c is dimensioned similar to the length of stylus 80, but as a result of advancing technology, the dimensions of Personal Digital Assistants are decreasing to cater to the demands for a smaller, easy to carry devices. As a result, the size of an ergonomically comfortable stylus 80 is longer than the smaller dimensioned Personal Digital Assistant. To overcome this issue, many manufactures have down-sized the length of the stylus to conform to the smaller dimensioned Personal Digital Assistant. The smaller size of the stylus has resulted in comfort and familiarity issues for the user. Users may experience difficulty using the smaller device.

Figure 6:
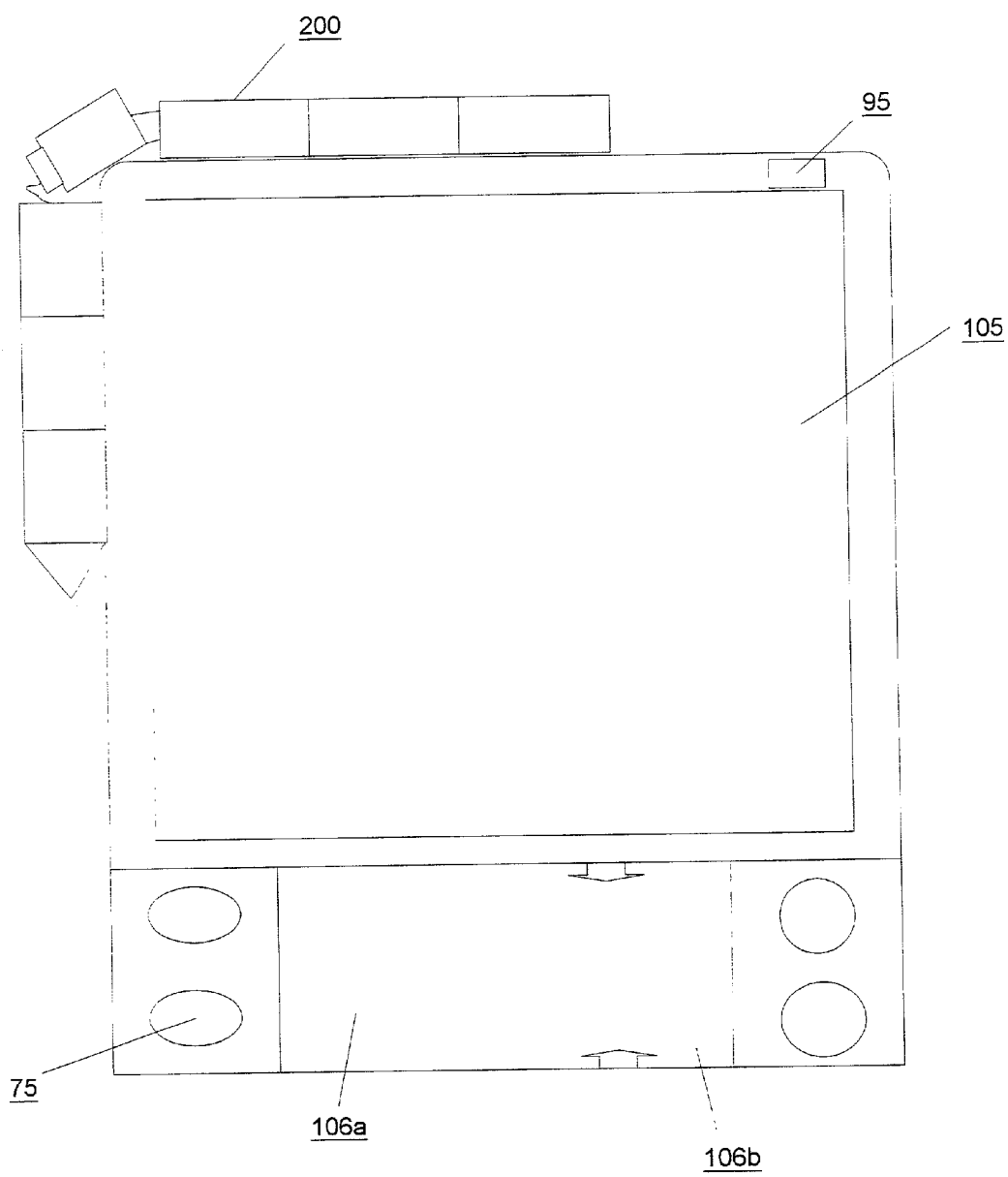
FIG. 6 is an illustration of an exemplary Personal Digital Assistant with a flexible bi-stable stylus wrapped around one of the corners in accordance with an embodiment of the present invention.

FIG. 6 is an illustration of a Personal Digital Assistant with a bi-stable stylus 200 that wraps around the corner of the device in one embodiment of the present invention. In this embodiment, a full size stylus 200 can be used and stored on the device even though the length of the stylus is larger than the length of the Personal Digital Assistant. In this embodiment, the stylus 200 can be bent around the edge of the device so the stylus does not protrude from the top as it would in many other configurations. In this embodiment the stylus has a plurality of segments that interlock to form the rigid body of the stylus. When the stylus is stored on the PDA, the interlocks can be disconnected and the stylus becomes pliable thus allowing the stylus to conform to the geometry of the PDA. When in use, the mid segments are held in place with an elastic member such as a spring to hold them in place to form a rigid body.

Figure 7A:
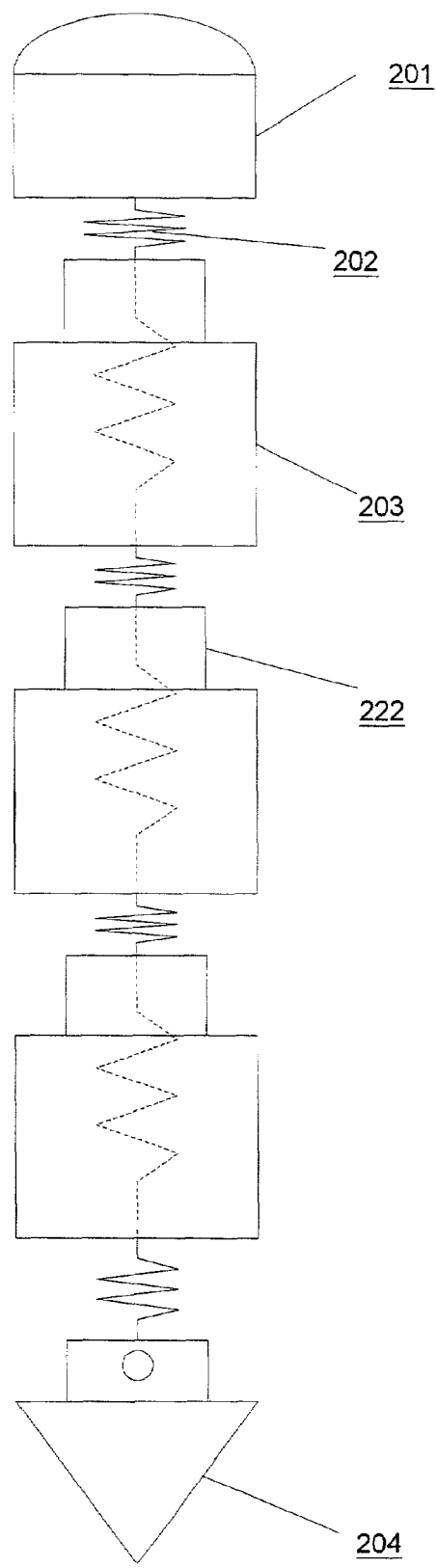
FIG. 7A is an illustration of a stretched flexible bi-stable stylus device that can conform to a smaller dimensioned Personal Digital Assistant and is comfortable for the user in accordance with an embodiment of the present invention.

FIG. 7A is an illustration of a flexible bi-stable stylus device that can conform to a smaller dimensioned Personal Digital Assistant and is comfortable for the user. This is an exploded view illustrating the different parts of the stylus in a stretched position. In FIG. 7A, the stylus is represented in a stretched position as it may appear before storage on an electronic device. The top of FIG. 7 is the end cap 201. Attached to the end cap 201 is an elastic member 202. In this embodiment, the elastic member 202 is a spring and in another embodiment, the elastic member can be a rubber band or a length of any elastic material that provides sufficient tension to hold the mid-segments in a locked position. The spring 202 attaches to the end cap 201 with a hook or any suitable connection for attaching the spring 202 to the end cap 201. The next elements of the stylus are the mid segments 203. The mid segments are hollow thus allowing the elastic member 202 to be placed in the center of the stylus. The number of mid segments 203 can vary depending on the dimensions of the mid segments and the desired length of the stylus. The desired length of the stylus can be achieved by altering the number of mid segments used in the manufacturing of the stylus.

Lastly, the pointed tip 204 completes the stylus device. Similar to the end cap 201, the elastic member 202 attaches to the tip 204 with a hook or another suitable connection mechanism. The mid segments 203 and the tip 204 share a common nesting mechanism 222. The nesting mechanism allows the segments to interlock into each other. For example, one end of the mid segment has a smaller diameter than the other end of the mid segment. As a result, the mid segments can interlock to form a rigid member.

Figure 7B:
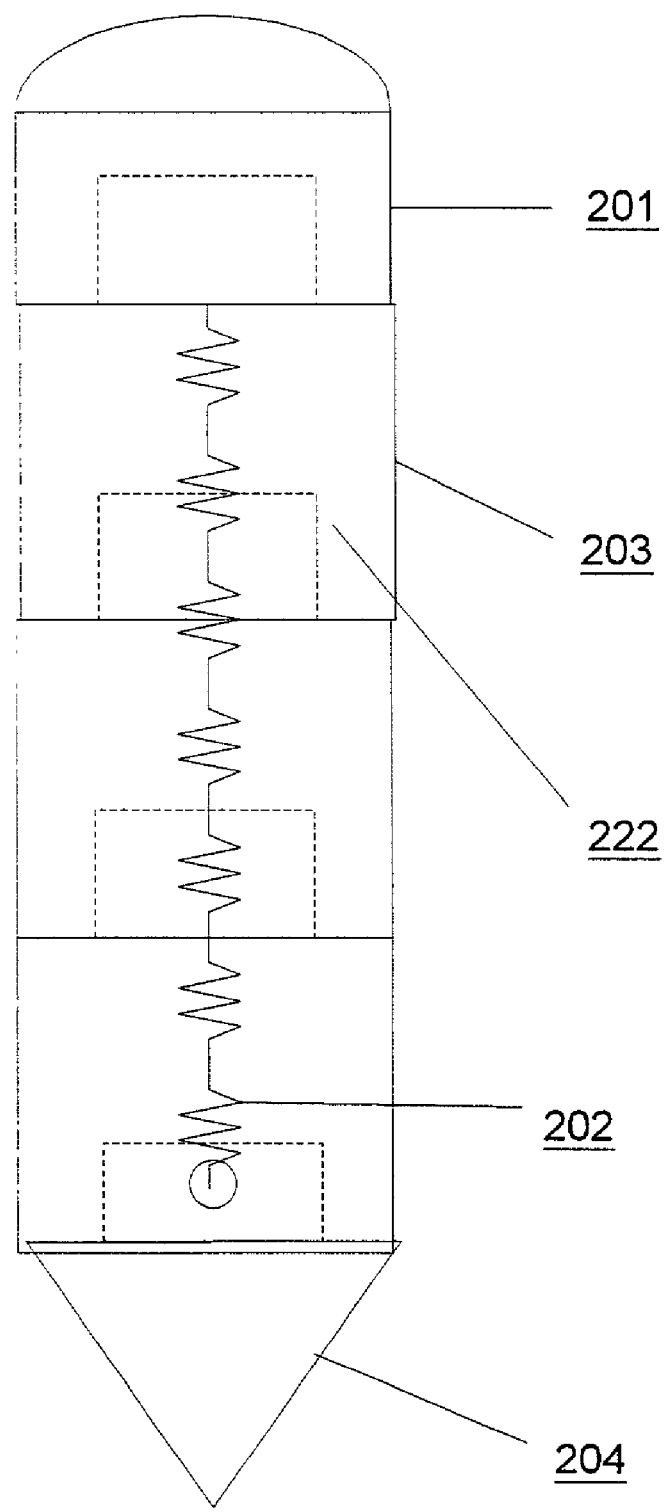
FIG. 7B is an illustration of a flexible bi-stable stylus device in a non-stretched position that can conform to a smaller dimensioned Personal Digital Assistant and is comfortable for the user in accordance with an embodiment of the present invention.

FIG. 7B is an illustration of stylus 200 in a locked position. In FIG. 7B, the nesting mechanism 222 is interlocked with the mid segments 203 and the end caps 201 and 204 to form a rigid member. In this embodiment, the elastic member is a spring 202 that traverses through the hollow mid segments 203 from the top end cap 201 to the tip 204.

Figure 8A:
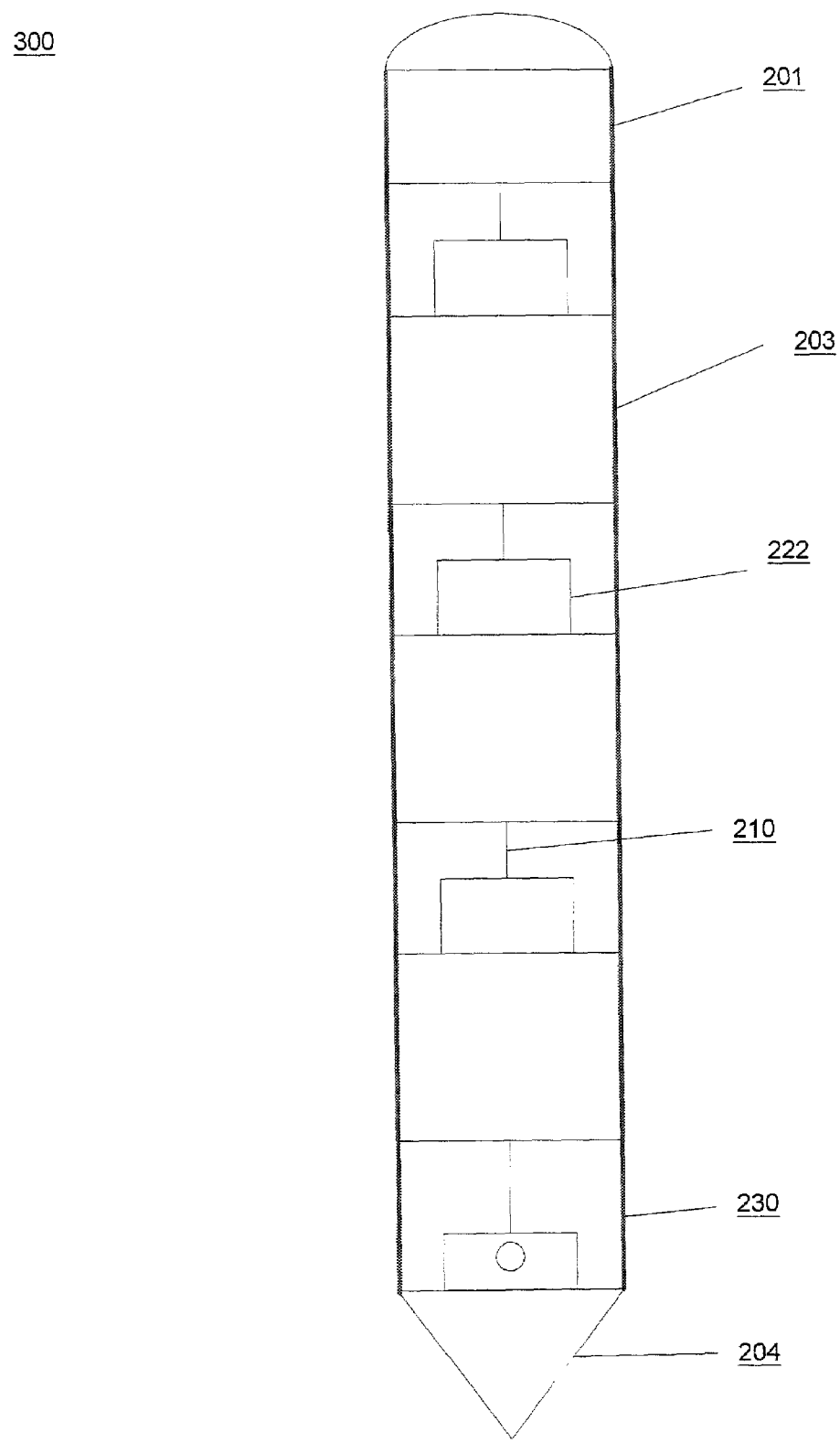
FIG. 8A is an illustration of a stretched flexible bi-stable stylus device incorporating a flexible outer sleeve in accordance with an embodiment of the present invention.

FIG. 8A is an illustration of a flexible bi-stable stylus device incorporating a flexible outer sleeve. Similar to FIG. 7, the stylus 300 incorporates many of the same elements. Referring to the top of FIG. 8, the end cap 201 is the same as FIG. 7. In addition, the mid segments, 203, tip 204, and nesting mechanism 222 are also similar to FIG. 7. In this embodiment, the elastic member is on the outside of the interlocking segments. In this embodiment, the elastic member is a tube 230 that is the length of the stylus. The outside elastic member 230 can be made in many different colors and textures to conform to the demands of the user. In another embodiment, the elastic tube 230 is clear and the interlocking mid segments are different colors. In this embodiment, the user can personalize the stylus by interchanging the segments of the stylus thus creating a personalized stylus device. The outer sleeve 230 can be made of any elastic material that provides sufficient tension to hold the mid-segments in a locked position.

In this embodiment, the outer tube 230 is under tension and thus holds the interlocking mid segments in place by aligning the nesting mechanism 222.

Figure 8B:
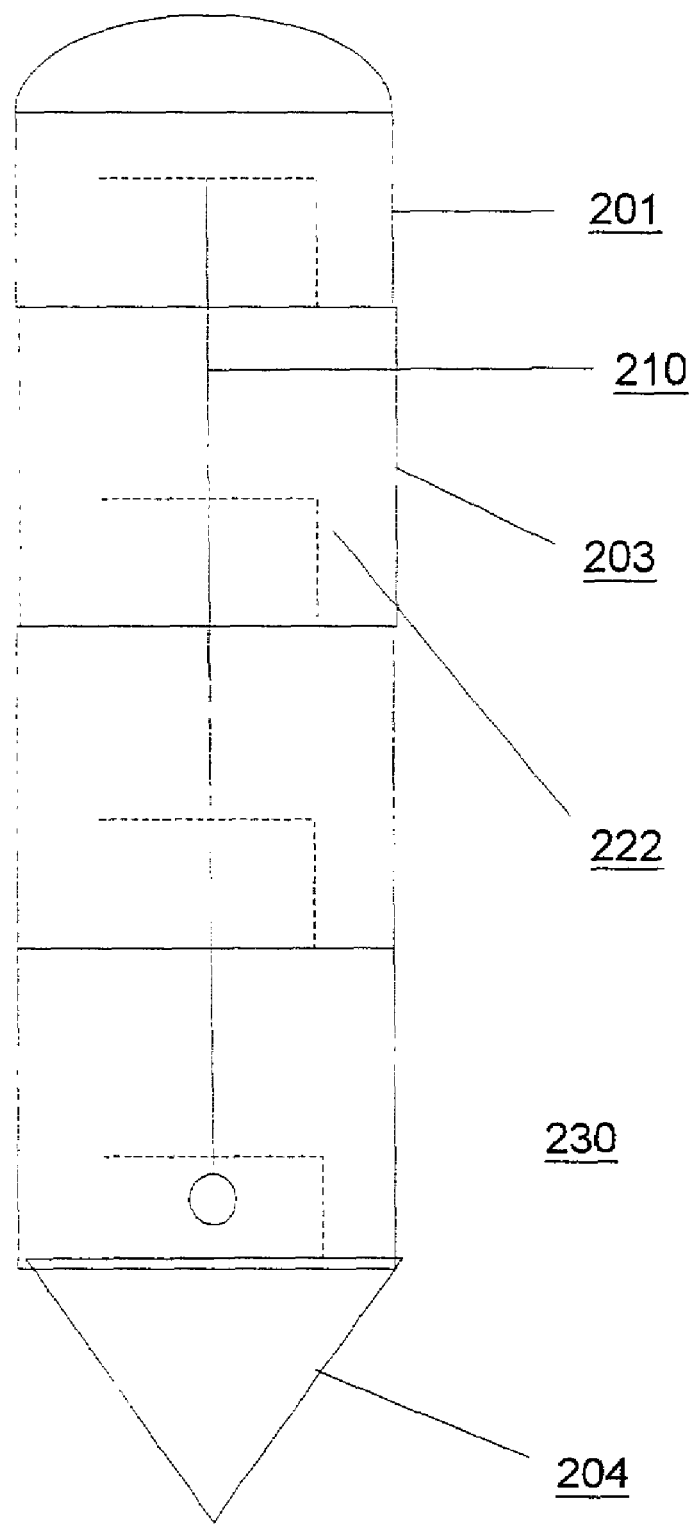
FIG. 8B is an illustration of a flexible bi-stable stylus device in a non-stretched position incorporating a flexible outer sleeve in accordance with an embodiment of the present invention.

FIG. 8B is an illustration of a flexible bi-stable stylus device incorporating a flexible outer sleeve in the locked position. In FIG. 8B, the nesting mechanism 222 is interlocked with the mid segments 203 and the end caps 201 and 204 to form a rigid member. In this embodiment, the elastic member is an elastic tube that covers the outside of the mid segments 203. In one embodiment, there is a member 210 that helps align the nesting mechanism 222 when locking the stylus. In one embodiment, the member 210 is a rubber member but it could be any suitable material to aid in the alignment of the nesting mechanism 222.

Figure 9:
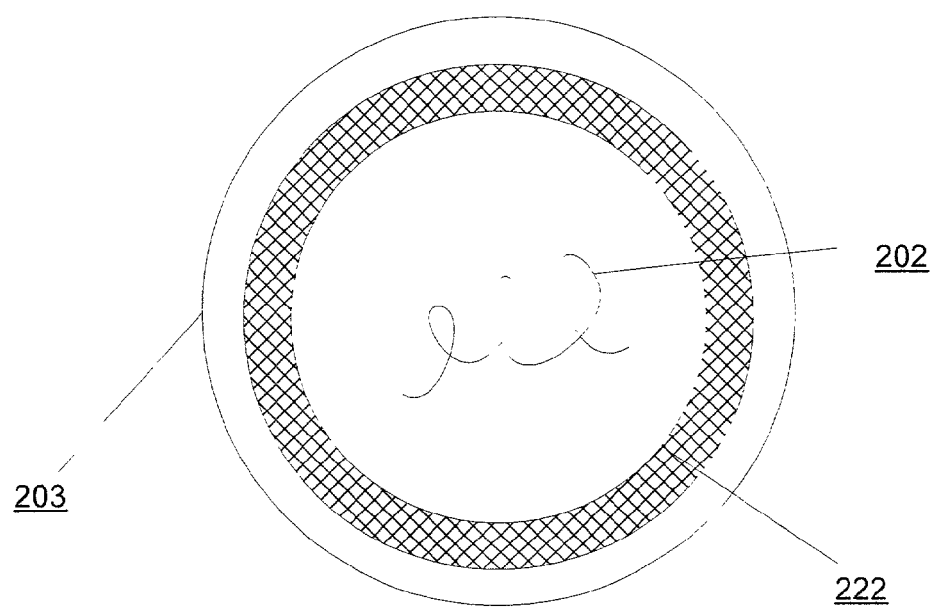
FIG. 9 is a cross section illustration of a bi-stable stylus mid-segment used in one embodiment of the present invention.

FIG. 9 is a cross section illustration of a mid-segment used in one embodiment of the present invention. In this illustration, the mid segment 203 and the nesting mechanism 222 are visible. In addition, the elastic member 202 is illustrated. In this embodiment, the mid segments are hollow and the elastic member 202 in the middle of the mid segments. In another embodiment, the elastic member is on the outer diameter of the mid segments. In this embodiment, the elastic member can be a tube.

The preferred embodiment of the present invention, a bi-stable stylus device, is thus described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable electronic device comprising:
   a processor coupled to a bus;
   memory coupled to said bus;
   a touch sensitive display screen coupled to said bus; and
   a stylus comprising:
      an elastic member;
      a first end cap tapered to a point and coupled to said elastic member wherein said first end cap is for interfacing with an electronic digitizer of said portable electronic device;
      a second end cap coupled to said elastic member; and
      a plurality of hollow interlocking mid-segments coupled to
   said elastic member between said first end cap and said second end cap.

2. A portable electronic device as described in claim 1 wherein said plurality of mid-segments comprise interlocking members to interlock with each other, said first end cap and said second end cap to form a rigid member.

3. A portable electronic device as described in claim 2 wherein said stylus becomes flexible when said first end cap is pulled away from said second end cap to disengage said interlocking members.

4. A portable electronic device as described in claim 2 wherein said elastic member is a spring.

5. A portable electronic device as described in claim 2 wherein said elastic member covers the outside of the stylus.

6. A portable electronic device as described in claim 2 wherein said stylus locks together by twisting said first end cap relative to said second end cap.

7. A portable electronic device as described in claim 1 wherein said elastic member is a spring comprising hooks on both ends and wherein said elastic member is located inside said plurality of hollow interlocking mid-segments.

8. A portable electronic device as described in claim 2 wherein said stylus can be simultaneously stored along more than one side of said portable electronic device.

9. A portable electronic device a described in claim 2 wherein said portable electronic device is a PDA (personal digital assistant).

10. A bendable stylus for use with a miniaturized portable electronic device, said stylus comprising:
    an elastic member;
    a first end cap tapered to a point and coupled to said elastic member, said first end cap for interfacing with a digitizer of said portable electronic device;
    a second end cap coupled to said elastic member; and
    a plurality of hollow interlocking mid-segments coupled to said elastic member between said first end cap and said second end cap.

11. A stylus as described in claim 10 wherein said plurality of mid-segments interlock with each other, said first end cap and said second end cap to form a rigid member.

12. A stylus as described in claim 11 wherein said stylus becomes flexible when said first end cap is pulled away from said second end cap to disengage said plurality of mid-segments.

13. A stylus as described in claim 10 wherein said elastic member is a spring.

14. A stylus as described in claim 10 wherein said elastic member covers the outside of said stylus.

15. A stylus as described in claim 10 wherein said elastic member is a spring and wherein said spring comprises hooks on both ends and wherein said spring is located inside said plurality of mid-segments.

16. A stylus as described in claim 10 wherein said elastic member is a clear tube.

17. A stylus as described in claim 10 wherein one or more of said plurality of mid segments are different colors.

18. A stylus for use with a touch screen having a digitizer, said stylus comprising:
    an elastic member;
    a first end cap tapered to a point and coupled to said elastic member, wherein said first end cap is for interfacing with said digitizer;
    a second end cap coupled to said elastic member; and
    a plurality of hollow interlocking mid-segments coupled to said elastic member between said first end cap and said second end caps.

19. A stylus as described in claim 18 wherein said mid-segments are operable to interlock with each other, said first end cap and said second end cap to form a rigid member.

20. A stylus as described in claim 19 wherein said stylus is operable to become flexible when said first end cap is pulled away from said second end cap to disengage interlocking members of said mid-segments and said first and second end caps.

21. A stylus as described in claim 18 wherein said elastic member is a spring.

22. A stylus as described in claim 18 wherein said elastic member covers the outside of the stylus.

23. A stylus as described in claim 18 wherein said stylus locks together by twisting said first end cap relative to said second end cap.

24. A stylus as described in claim 18 wherein said plurality of interlocking mid-segments are a plurality of hollow interlocking mid-segments.

25. A stylus as described in claim 24 wherein said elastic member is a spring and wherein said spring comprises hooks on both ends and wherein said spring is extended within said hollow interlocking mid-segments.

* * * * *